Sept. 17, 1940.  J. M. WALTER  2,215,140
MACHINE TOOL FEED
Filed March 10, 1939  2 Sheets-Sheet 2
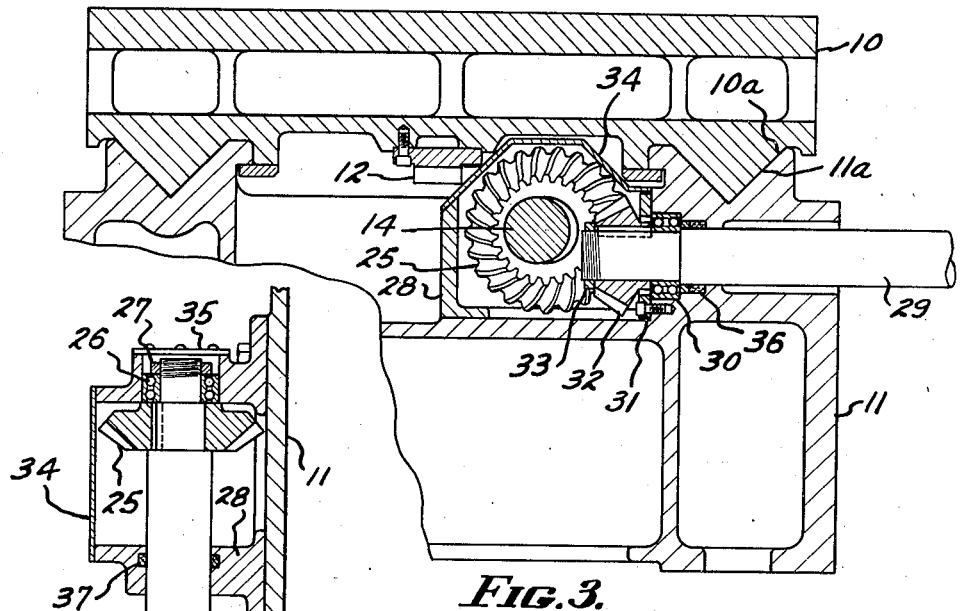
Fig.3.
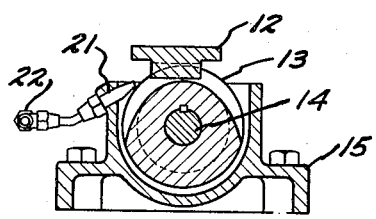
Fig.5.
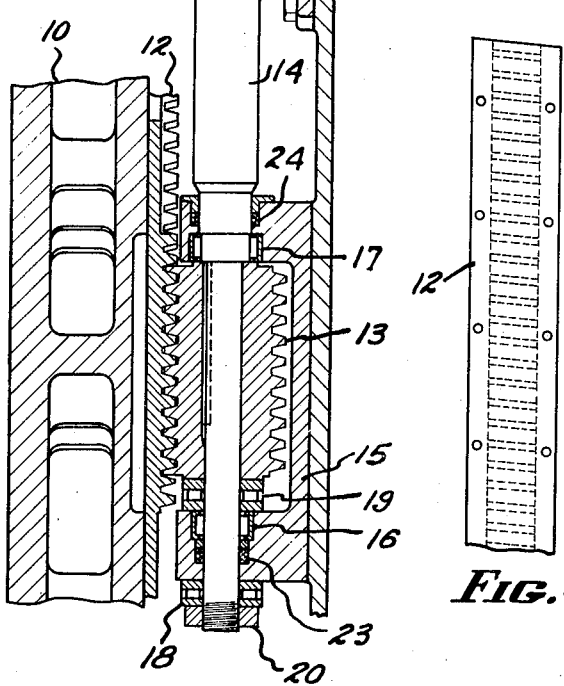
Fig.4.
Fig.2.
INVENTOR.
JOHN M. WALTER
BY
Allen & Allen
ATTORNEYS.

Patented Sept. 17, 1940

2,215,140

UNITED STATES PATENT OFFICE 2,215,140

MACHINE TOOL FEED

John M. Walter, Cincinnati, Ohio, assignor to The G. A. Gray Company, Cincinnati, Ohio, a corporation of Ohio Application March 10, 1939, Serial No. 261,010

7 Claims. (Cl. 90—35)

This invention relates to feeding or reciprocating means for machine tool elements, more particularly the work table of planer-type milling machines or of boring machines of the horizontal rotating bar type.

The primary object of the present invention is to provide a simple inexpensive table drive which will be self-locking in such a manner that the driving effect of one or several cutters against the work piece will not cause the table to move when the drive mechanism is at rest, or cause the table to be moved at a rate faster than that predetermined by the drive mechanism. In order that the backlash between the table and the drive will be at a minimum, it is desirable that the self-locking occurs between the rack on the table and the spiral pinion which it engages.

A further object of the present invention is to provide a table drive wherein smooth, steady feed motion, free of chatter, is obtained, even when heavy feed pressures are encountered. This is accomplished by the novel arrangement of the several parts of the drive, wherein the driving shaft may be short and of large diameter, thus minimizing the torsional yield of said shafts.

A further improvement in the present invention resides in the use of a pair of angular hypoid gears whereby the driving shaft may be of large diameter and yet pass under the guideway of the bed, while the driven shaft is mounted higher in the bed by reason of the offset afforded by the hypoid gears. By mounting said driven shaft higher in the bed, the shelf on which it is mounted is placed correspondingly higher, thereby greatly stiffening the bed. The higher mounting of the driven shaft also places the rack nearer the work surface of the table which reduces the tendency to lift the table when heavy feed pressures occur. These advantages are not obtained in the usual spiral pinion and rack table drives, wherein the spiral pinion shaft passes under the bed way, thus increasing the length of the shaft and placing the spiral pinion at a low level in the bed; and wherein the angle formed by the axis of the spiral pinion and the center line of the bed way is several times larger than in the present invention, in which case a self-locking drive cannot result without undesirable side thrust on the table.

The side thrust, in the present invention, can be made a negligible amount because it is possible to select the lead and pitch diameter of the spiral pinion, and the angle formed by the axis of the spiral pinion and the center line of the bed, due to the novel arrangement to be fully described.

Other objects and advantages of the invention will be apparent from the specifications and accompanying drawings.

Fig. 2 is a section taken on line 2—2 of Figure 1.

Fig. 3 is a section taken on line 3—3 in Figure 1.

Fig. 4 is a detached plan view of the rack.

Fig. 5 is a section taken on line 5—5 of Figure 1.

Figure 1:
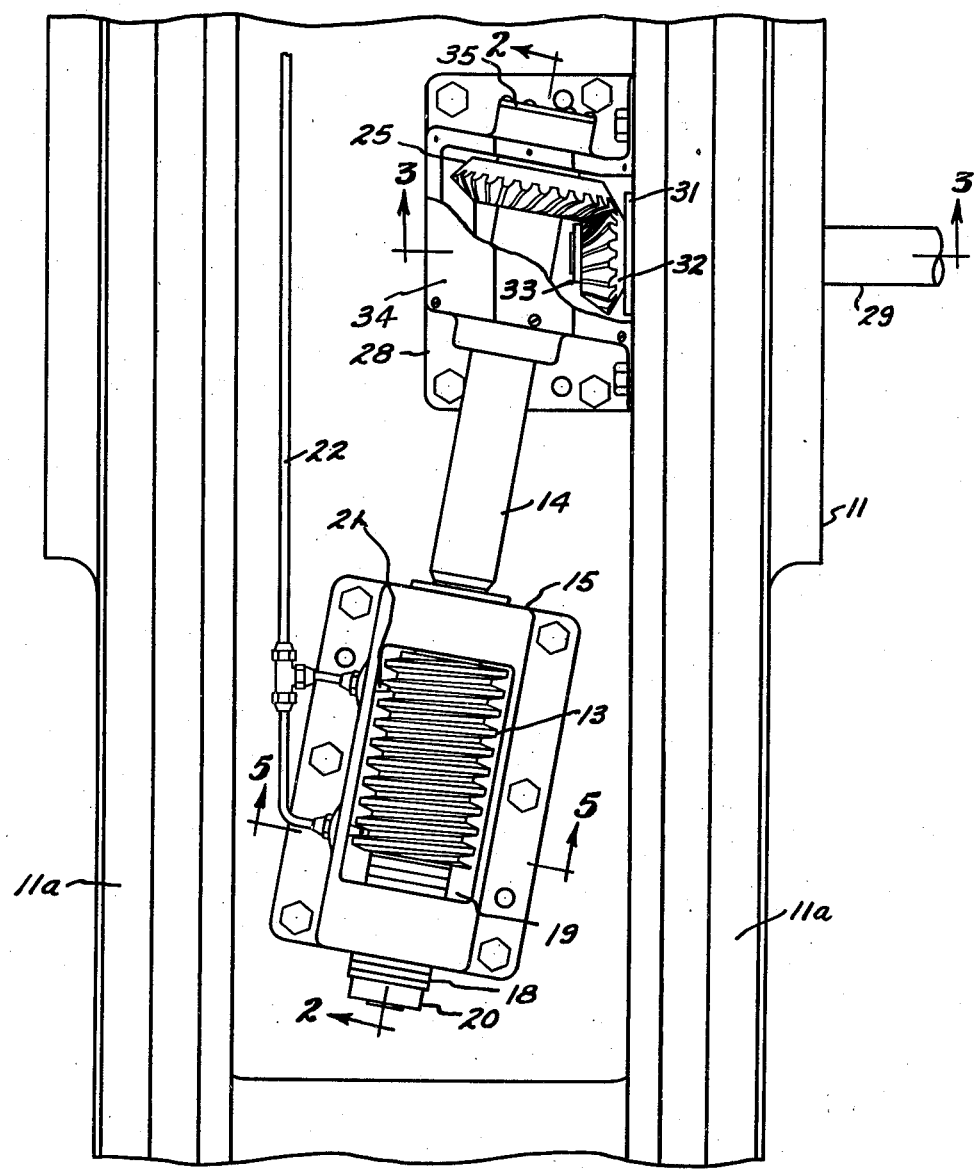
Figure 1 is a plan view of a machine tool bed, embodying my invention. The work table has been removed in this view for the purpose of clarity.

While the invention is susceptible of various modifications and alternative constructions, a preferred embodiment is shown in the drawings and will be herein described.

The work table or carriage 10 is mounted for horizontal reciprocation on the bed 11, the table having two V shaped guideways 10a which slide on the guideways 11a formed in the bed. Other guides and supports could be employed. A rack 12 extends parallel to the guideways and is fastened to the table by means of screws and dowel pins, and is usually made in sectional lengths placed end to end. As shown in section in Fig. 2, the rack teeth are formed with straight converging sides. They are also formed obliquely to the sides of the rack, as shown in Fig. 4, being tangent to the helix angle at the pitch diameter of the spiral pinion 13.

The spiral pinion has preferably only one tooth formed helically with a uniform lead corresponding to the pitch of the rack teeth in the plane of the spiral pinion. Such a pinion with its axis directed as shown, and with the helix angle thus made possible, will be self-locking in the event that great pressure is exerted on the table as previously described.

Spiral pinions having three or four teeth and a correspondingly larger lead, are commonly used for feeding work tables or carriages herein referred to. The employment of such a larger lead cannot result in a self-locking drive at the rack, thus necessitating a self-locking worm drive or equivalent for driving the spiral pinion shaft which introduces more backlash in the drive. In such drives the spiral pinion shaft must be inclined at a greater angle relative to the rack, making it necessary to place the worm drive or equivalent, for the spiral pinion shaft, outside of the bed. This results in a relatively long spiral pinion shaft having reduced torsional stiffness. Due to these objections, this type of drive has been abandoned in favor of more elaborate and expensive mechanisms. The purpose of this invention is to retain the simplicity and favorable wearing qualities of the spiral pinion and to eliminate the objections referred to.

The axis of the spiral pinion is so nearly parallel to the rack that the pinion may be made of considerable length, this being determined largely by practical considerations involving the accuracy and positioning of the several parts.

The spiral pinion 13 is securely keyed to the spiral pinion shaft 14 which in turn is rotatably journaled in the carrier 15 by roller bearings 16 and 17. It will be apparent that the spiral pinion shaft may be made of large diameter thereby greatly increasing its torsional stiffness. Carrier 15 is securely bolted and dowelled to the bed. Axial movement of the spiral pinion is restrained by the roller thrust bearings 18 and 19, these being adjusted with a minimum clearance by the nut 20.

In a drive of this type the pressure between the spiral pinion tooth and the rack teeth is often of considerable magnitude and it is therefore desirable that these surfaces be adequately and properly lubricated. Furthermore, it is desirable that the surfaces be wetted with lubricant before the spiral pinion begins to rotate to insure lubrication at the instant the pressure on the surfaces occurs. To this end the lubricant is sprayed into the rack tooth spaces by several nozzles 21 connected to a pipe 22 which delivers the lubricant under pressure from a pump. This same pump also provides lubricant under pressure to the guideways of the bed and table. The lubricant is then carried into the carrier 15 wherein a high lubricant level to just below the tips of the rack teeth is maintained, for which purpose packings 23 and 24 are provided around the shaft 14.

A hypoid angle gear 25 is keyed to the spiral pinion shaft adjacent to the ball bearing 26 and is restrained axially by the nut 27, said ball bearing being in turn supported in case 28. The case 28 is securely bolted and doweled to the bed, being bolted on the side as well as on the bottom.

A shaft 29 is rotatably journaled in the bed 11 by the ball bearing 30 which is restrained axially by the flange 31 bolted to the bed. The opposite end of shaft 29 is journaled in a speed changing gear box not shown in the drawings. A hypoid angle pinion 32 is secured on the shaft 29 by a key and by the nut 33.

It will be apparent that the torque imposed on the shaft 29 will be considerably less than that imposed on the spiral pinion shaft 14 by reason of the gear reduction of the hypoid angle gears. It will also be noted that the shaft 29 is placed at a level just below the guideway of the bed and that the offset of the hypoid gears places the spiral pinion shaft 14 at a level in the bed above the shaft 29, which brings the shaft 14 to a high level with the advantages heretofore noted.

Hypoid gears are best lubricated with heavy oils known as extreme pressure lubricants. For this reason these gears are separately enclosed, the covers 34 and 35 serving to close the openings in the case 28. A packing 36 around shaft 29 and a packing 37 around shaft 14 serve to retain the lubricant at these points.

Having thus described my invention, what I claim as new and desire to secure by Letters Patent is:

1. In a machine tool the combination with a bed structure and a work table to be reciprocated thereon, a self locking drive for the table comprising a rack fast to said work table extending in the direction of its travel, a shaft having a spiral pinion thereon meshing with the rack, the helix angle of the spiral pinion being such as to be self locking with relation to the rack and the axis thereof being out of parallel with the rack, a second shaft disposed generally transversely of the rack, and gear means coupling the second shaft to the shaft first mentioned.

2. In a machine tool the combination with a bed structure and a work table to be reciprocated thereon, a self locking drive for the table comprising a rack fast to said work table extending in the direction of its travel, a shaft having a spiral pinion thereon meshing with the rack, the helix angle of the spiral pinion being such as to be self locking with relation to the rack and the axis thereof being out of parallel with the rack, a second shaft disposed generally transversely of the rack, and gear means coupling the second shaft to the shaft first mentioned, said first mentioned shaft being located with its axis in a plane above the plane of the axis of the second shaft.

3. In a machine tool the combination with a bed structure and a work table to be reciprocated thereon, a self locking drive for the table comprising a rack fast to said work table extending in the direction of its travel, a shaft having a spiral pinion thereon meshing with the rack, the helix angle of the spiral pinion being such as to be self locking with relation to the rack and the axis thereof being out of parallel with the rack, a second shaft disposed generally transversely of the rack, and gear means coupling the second shaft to the shaft first mentioned, the said gears being of the hypoid type.

4. In a machine tool the combination with a bed structure and a work table to be reciprocated thereon, a self locking drive for the table comprising a rack fast to said work table extending in the direction of its travel, a shaft having a spiral pinion thereon meshing with the rack, the helix angle of the spiral pinion being such as to be self locking with relation to the rack and the axis thereof being out of parallel with the rack, a second shaft disposed generally transversely of the rack, and gear means coupling the second shaft to the shaft first mentioned, said first mentioned shaft being located with its axis in a plane above the plane of the axis of the second shaft, the said gears being of the hypoid type.

5. In a machine tool the combination with the bed structure and a work table to be reciprocated thereon, a drive means for the table comprising a rack extending in the direction of travel of the table and secured fast on its under side, a shaft having a spiral pinion thereon meshing with said rack and the axis thereof being out of parallel with the rack, a second shaft extending through the bed at substantially right angles to the bed, and hypoid gears between the second shaft and the shaft first mentioned.

6. In a machine tool the combination with the bed structure and a work table to be reciprocated thereon, a drive means for the table comprising a rack extending in the direction of travel of the table and secured fast on its under side, a shaft having a spiral pinion thereon meshing with said rack and the axis thereof being out of parallel with the rack, a second shaft extending through the bed at substantially right angles to the bed, and hypoid gears between the second shaft and the shaft first mentioned, the shaft first mentioned being located in a plane above that of the shaft secondly mentioned.

7. In a machine tool the combination of a support, a carriage slidably mounted on the support, an elongated rack rigid on said carriage, a first shaft inclined relative to said rack and having a spiral pinion thereon in driving engagement with said rack, a second shaft disposed transversely to the rack, a pair of hypoid angle gears whereby the second shaft drives the first mentioned shaft, and a gear case in which said hypoid gears are enclosed.

JOHN M. WALTER.